United States Patent [19]

Worrell et al.

[11] Patent Number: 5,380,037
[45] Date of Patent: Jan. 10, 1995

[54] SNAP-IN INFLATABLE RESTRAINT MODULE MOUNTING MECHANISM INCLUDING LATCH ELEMENTS

[75] Inventors: Barry C. Worrell, Centerville; Paul M. Landis, Englewood; Harold W. Morgan, Miamisburg; Larry E. Flora, Laura; all of Ohio

[73] Assignee: General Motors Corporation, Detroit, Mich.

[21] Appl. No.: 140,821

[22] Filed: Oct. 25, 1993

[51] Int. Cl.6 .............................. B60R 21/20
[52] U.S. Cl. ................ 280/728 A; 280/731; 200/61.55; 403/329; 403/319; 24/453
[58] Field of Search ........... 280/728 A, 731, 728 R; 200/61.54, 61.55, 61.56, 61.57; 403/319, 326, 329, 315; 24/297, 453, 662; 74/552

[56] References Cited

U.S. PATENT DOCUMENTS

| | | | |
|---|---|---|---|
| 3,712,968 | 1/1973 | Bonn et al. | 200/61.56 |
| 4,176,428 | 12/1979 | Kimura | 24/297 |
| 4,716,633 | 1/1988 | Rizo | 24/453 |
| 4,785,144 | 11/1988 | Fosnaugh et al. | 200/61.55 |
| 4,789,763 | 12/1988 | Nagata et al. | 200/61.55 |
| 5,005,860 | 4/1991 | Mori et al. | 280/731 |
| 5,085,461 | 2/1992 | Shibata | 280/731 |
| 5,087,069 | 2/1992 | Corbett et al. | 280/731 |
| 5,149,127 | 9/1992 | Manabe et al. | 280/731 |
| 5,186,073 | 2/1993 | Doolittle et al. | 403/326 |
| 5,239,147 | 8/1993 | Allard et al. | 200/61.55 |

FOREIGN PATENT DOCUMENTS

| | | | |
|---|---|---|---|
| 2351300 | 5/1976 | France | 403/329 |
| 1948615 | 4/1971 | Germany | 280/731 |
| 4169357 | 6/1992 | Japan | 280/728 A |
| 0514227 | 11/1939 | United Kingdom | 24/453 |

*Primary Examiner*—Mitchell J. Hill
*Assistant Examiner*—Peter C. English
*Attorney, Agent, or Firm*—Charles E. Leahy

[57] ABSTRACT

An inflatable restraint module mounting mechanism is disclosed for use in mounting an inflatable restraint module to a support structure such as the hub portion of a steering wheel. The inflatable restraint module is provided with a plurality of mounting members which are adapted to pass through and be retained within apertures in a support plate. The mounting members each include a slot for receiving a spring which traverses across the apertures of the support plate. The slots are preferably sized such that the mounting members are supported for limited movement in a direction longitudinal of the mounting members to permit actuation of a horn circuit. In addition, the springs are movable in a lateral direction to facilitate insertion of the mounting members through the apertures in the support plate.

5 Claims, 2 Drawing Sheets

SNAP-IN INFLATABLE RESTRAINT MODULE MOUNTING MECHANISM INCLUDING LATCH ELEMENTS

BACKGROUND OF THE INVENTION

1. Field of the Invention

This invention relates generally to a supplemental inflatable restraint and, more particularly, to a mechanism for quickly mounting an inflatable restraint module to a supporting structure.

2. Description of Related Art

In the past, supplemental inflatable restraints have been incorporated into the steering wheel of automobiles in order to protect the driver of the automobile in the event of a collision. In addition, supplemental inflatable restraints have also been incorporated into the dashboard of automobiles in order to protect the front seat passenger. Conventional supplemental inflatable restraints comprise a restraint module which houses an inflatable air bag and an inflator. The module further includes a pad or door portion covering the front portion of the module and which is adapted to open and permit deployment of the air bag.

Various mechanisms have been produced for securing the inflatable restraint module to a support structure in a vehicle, such as the steering wheel or dashboard. In one known mounting system, bolts are provided passing from the rear of the support structure wherein the bolts threadably engage threaded nuts mounted on the restraint module. It is further known to provide such a restraint module mounting system for a vehicle steering wheel wherein sleeve members mounted to the restraint module and surrounding the mounting bolts may be forced into contact with a plate forming the supporting structure on the steering wheel hub to complete a circuit for actuating a horn.

In another known restraint module mounting system, a plurality of hollow support members are mounted to the hub portion of a steering wheel for receiving mounting members depending from the restraint module. Spring clips are provided for engaging through slots or recesses in the support members and mounting members to releasably secure the mounting members within the support members when the restraint module is moved into place within the hub portion. In this mounting system, the restraint module is immovably held in fixed relation relative to the hub forming the mounting structure.

It is desirable to provide a supplemental inflatable restraint module mounting mechanism wherein the module is adapted to be mounted to support structures without requiring the use of conventional fasteners, such as screws or bolts. It is desirable to provide such a mounting arrangement wherein the restraint module is retained on a support structure in response to movement of the restraint module in a direction toward the support structure.

SUMMARY OF THE INVENTION

It is therefore a primary object of the present invention to provide an inflatable restraint module mounting mechanism which permits the inflatable restraint module to be mounted to a support structure of a vehicle, such as a steering wheel, without requiring access to the rear face of the support structure.

In one aspect, this invention comprises a mounting mechanism for use in combination with a supplemental inflatable restraint module wherein the mechanism includes a support plate having opposing front and rear faces and a plurality of apertures therethrough for receiving mounting members attached to the inflatable restraint module. Each of the mounting members includes a distal end movable in a first direction past the front face of the support plate. In addition, latch elements are mounted on the support plate and are movable in a lateral direction for engagement with the mounting members to prevent movement of the distal ends in a second direction, opposite to the first direction, past the rear face.

In a further aspect of the invention, each of the mounting members include a slot at the distal end In addition, the latch elements comprise elongated resilient members which traverse across the apertures of the support plate for engagement with the slots to thereby retain the distal ends within the apertures.

In yet a further aspect of the invention, the slots are formed with a larger dimension than the resilient members in a direction parallel to the longitudinal axis of the mounting members such that the mounting members are movable along the longitudinal axis a predetermined amount relative to the resilient members. In this manner, the inflatable restraint module is mounted for limited movement relative to the hub portion to provide for actuation of a horn of the vehicle.

Other objects and advantages of the invention will be apparent from the following description, the accompanying drawings, and the appended claims.

DETAILED DESCRIPTION OF THE PREFERRED EMBODIMENT

Figure 1:
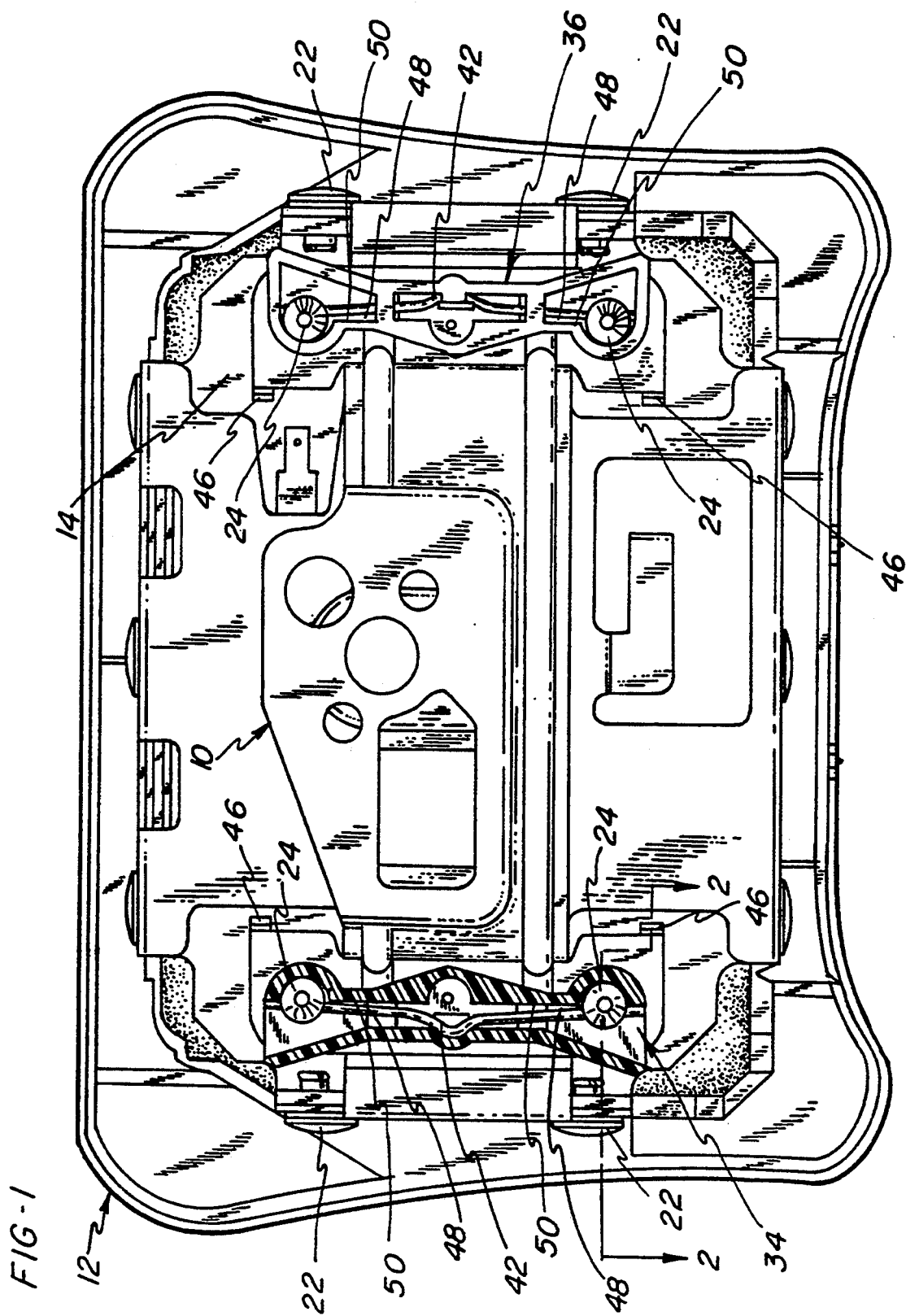
FIG. 1 is a plan view of the lower portion of a hub and inflatable restraint module assembly incorporating the mounting mechanism of the present invention with one of the spring housings partially cut away.

Referring to FIG. 1 of the drawings, the lower central portion of a steering wheel is shown in plan view. For the purpose of clarity in illustrating the present invention, a lower shroud 11 (see FIG. 2) has been removed from FIG. 1, and a conventional steering wheel rim and spokes for supporting the rim are also not shown. However, it should be understood the lower shroud, rim and spokes are mounted to a support plate 10 to form an open hub portion wherein the support plate 10 is attached to a steering shaft of a vehicle in a conventional manner. In addition, an inflatable restraint module 12 is located within the open hub portion and attached to the support plate 10 by the mounting mechanism of the present invention.

Figure 2:
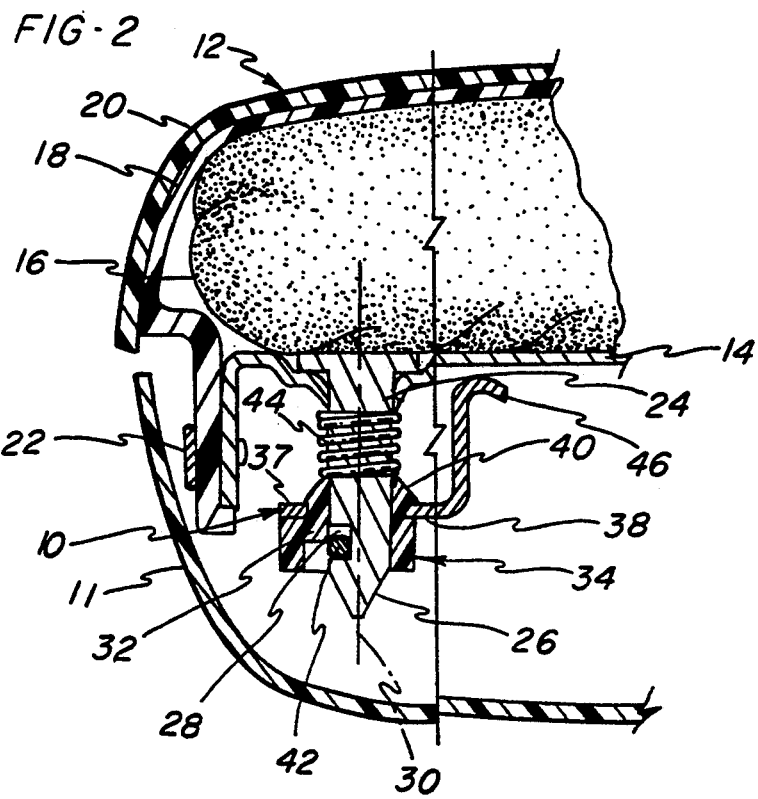
FIG. 2 is a cross-sectional view taken along line 2—2 in FIG. 1.

Referring also to FIG. 2, the inflatable restraint module 12 is formed in a conventional manner and generally includes a base plate 14 for mounting an air bag and inflator, generally depicted as 16. The air bag and inflator 16 are encapsulated in a container 18 which is covered by an outer soft cover or pad 20. The container 18 is bolted to the base plate 14 by fasteners 22 to form the assembled module 12.

A plurality of elongated cylindrical mounting members 24 are rigidly mounted to the base plate 14 and extend therefrom toward the support plate 10. In the preferred embodiment, four such mounting members are provided attached to the base plate 14. Each of the mounting members 24 includes a tapered distal end 26 and a slot 28 which is elongated in a direction parallel to a longitudinal axis 30 of the mounting member 24.

The support plate 10 is formed with a plurality of apertures 32 corresponding in number and location to the number and location of the mounting members 24 whereby the apertures 32 are disposed to receive the distal ends 26 of the mounting members 24 therethrough. A pair of spring housings 34 and 36 are mounted to a rear face 38 of the support plate 10. The spring housings 34, 36 each include a pair of slotted detent mounts 40 for extending through the apertures 32 to hold the spring housings 34, 36 in position on the support plate 10. Further, the spring housings 34, 36 are preferably formed of an insulating material, such as a plastic.

As is best seen in FIG. 1, each of the spring housings 34, 36 are adapted to house an elongated spring 42 wherein each spring 42 extends between a pair of the apertures 32. In addition, opposing ends of each of the springs 42 are positioned such that they traverse across respective apertures 32 in order to ensure that the springs 42 contact the mounting members 24 as the inflatable restraint module 12 is moved into association with the support plate 10. Further, the springs 42 are preferably formed of a resilient material such as music wire whereby the springs 42 are resiliently yieldable in a lateral direction, transverse to the longitudinal axis 30, to permit insertion of the mounting members 24 through the apertures 32 and past the springs 42, which movement is facilitated by the tapered configuration of the distal ends 26.

Thus, when the mounting members 24 are moved in a first direction toward a front face 37 of the support plate 10 and through the apertures 32, the springs 42 will move laterally outwardly until they are aligned with the slots 28, at which time the springs 42 will move laterally inwardly into contact with the slots 28. In this position, the springs 42 prevent the mounting members 24 from moving in a second direction out of the apertures 32 whereby the inflatable restraint module 12 is held in operative relationship to the support plate 10. It should be noted that the dimension of the slots 28 in a direction parallel to the longitudinal axis 30 is greater than the dimension of the springs 42 in the same direction to thereby permit a limited predetermined amount of movement of the restraint module 12 relative to the support plate 10. In addition, springs 44 are provided surrounding each of the mounting members 24 for biasing the restraint module 12 outwardly away from the support plate 10.

The support plate 10 is further provided with contact members 46 located adjacent to each of the apertures 32 and extending toward the base plate 14. It should be understood that the support plate 10 and base plate 14 are preferably formed of a conductive metal material such that the contact members 46 define a first contact portion for the switch and the portions of the base plate 14 located in alignment with the end surfaces of the contact members 46 define a second contact portion for the switch. Thus, when a driver of the vehicle applies a force to the restraint module 12 sufficient to overcome the bias of the springs 44, the base plate 14 will move into contact with the contact members 46 to thereby complete a horn activating circuit in combination with a power source (not shown) which is connected across the contact members 46 and the base plate 14. Further, it should be apparent that by providing a non-conductive material for the spring housings 34, 36, the mounting members 24 are insulated from the support plate 10 to thereby prevent the mounting members 24 from forming a continuous electrical path between the base plate 14 and the support plate 10.

If it is desired to separate the restraint module 12 from the support plate 10, a screwdriver may be inserted through apertures provided in a rear portion of the steering wheel (not shown), wherein the blade of the screwdriver is received within spaces 48 provided in the spring housings 34, 36, and the screwdriver is then rotated. Rotation of the screwdriver blade located within the areas 48 causes the blade to contact an end of the spring 42 and a wall 50 opposite from the spring 42 to thereby bias the spring 42 laterally outwardly and out of engagement with the slot 28. In this manner, the mounting members 24 are released to move out of engagement with the support plate 10.

Figure 3:
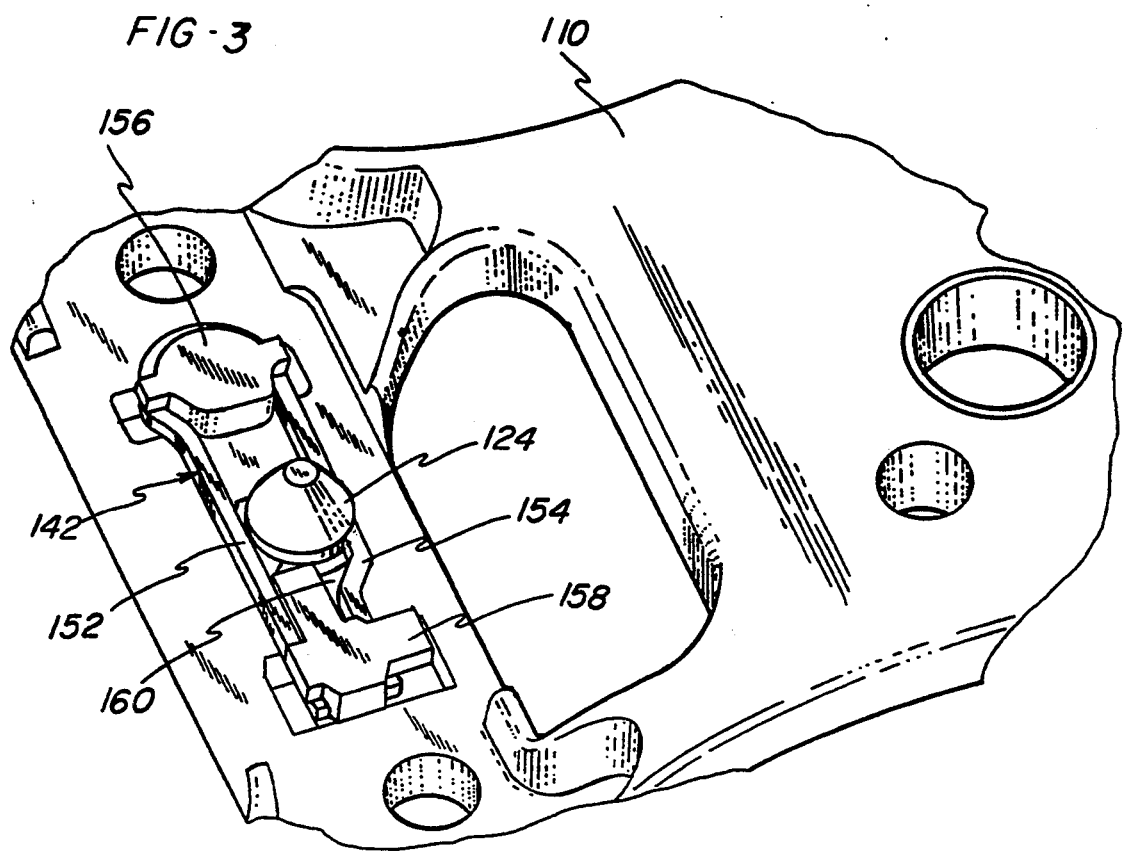
FIG. 3 is a perspective view of a support plate for a steering wheel incorporating an alternative embodiment of the present invention.

FIG. 3 illustrates a further embodiment of the present invention. In this embodiment, a hairpin-shaped spring 142 is provided having a first leg 152 and a second leg 154 wherein the legs 152, 154 are substantially parallel to each other. The spring 142 extends around a support post 156 on a rear side of the support plate 110. The second leg 154 is adapted to engage a slot in a mounting member 124 in a manner similar to the previous embodiment whereby a distal end of the mounting member 124 is held in position within an aperture formed in the support plate 110.

A second support post 158 is provided adjacent to a distal end of the legs 152, 154 for maintaining the spring 142 aligned over the aperture for receiving the mounting member 124. In addition, a screwdriver may be inserted into a space 160 located between the second support post 158 and the second spring leg 154 wherein rotation of the screwdriver will result in the spring leg 154 being biased outwardly out of engagement with the mounting member 124 to permit removal of an inflator module from the support plate 110. Further, it should be noted that in this embodiment, the inflator module is provided with only two mounting members 124 for insertion through two corresponding apertures in the support plate 110.

From the above description, it should be apparent that the present invention provides a mechanism for retaining an inflatable restraint module in association with a support plate. In addition, the present invention provides such a mechanism located on the rear face of a support plate such that it may be readily accessed by a screwdriver to facilitate removal of the inflatable restraint module from the support plate.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. In combination with a vehicle steering wheel having an open hub portion and an inflatable restraint module, an inflatable restraint module mounting mechanism comprising:

a support plate attached to said steering wheel and having opposing front and rear faces and a plurality of apertures therethrough, a plurality of elongated mounting members attached to said inflatable restraint module, each said mounting member including a distal end and means defining a slot at said distal end, said distal ends extending through said apertures, a plurality of elongated resilient members mounted to said rear face, each said resilient member traversing across at least two of said apertures and engaging with at least two of said slots to thereby retain said distal ends within said apertures, springs extending between said inflatable restraint module and said support plate for biasing said inflatable restraint module away from said hub portion, contact members extending from said support plate for contact with said inflatable restraint module, and wherein said slots have a larger dimension than said resilient members in a direction parallel to a longitudinal axis of said mounting members such that said mounting members are movable along said longitudinal axis a predetermined amount relative to said resilient members, said contact members contacting said inflatable restraint module when said mounting members are moved in a direction toward said support plate to complete a circuit for actuating a horn.

2. In combination with a vehicle having an inflatable restraint module, an inflatable restraint module mounting mechanism comprising:

a support plate having opposing front and rear faces, mounting members attached to said inflatable restraint module, each said mounting member including a distal end movable in a first direction past said front face of said support plate, latch elements mounted on said support plate, said latch elements being movable in a lateral direction for engagement with said mounting members to prevent movement of said distal ends in a second direction, opposite to said first direction, past said rear face, and said latch elements including a pair of elongated resilient members, each said resilient member being disposed no engage two of said mounting members to thereby prevent said distal ends from moving past said rear face.

3. In combination with a vehicle steering wheel having an open hub portion and an inflatable restraint module, an inflatable restraint module mounting mechanism comprising:

a support plate attached to said steering wheel and having opposing front and rear faces and a plurality of apertures therethrough, mounting members attached to said inflatable restraint module, each said mounting member including a distal end and means defining a slot at said distal end, latch elements mounted on said support plate for movement in a lateral direction toward and away from said mounting members, said latch elements being disposed for engagement with said slots in said mounting members, wherein movement of said distal ends in a first direction past said front face and through said apertures causes said latch elements to engage with said slots, and said engagement between said latch elements and said slots prevents movement of said distal ends in a second opposite direction out of said apertures, and said latch elements including a pair of elongated resilient members, each said resilient member being disposed to engage two of said mounting members to thereby prevent said distal ends from moving past said rear face.

4. In combination with a vehicle having an inflatable restraint module, an inflatable restraint module mounting mechanism comprising:

a support plate having opposing front and rear faces, mounting members attached to said inflatable restraint module, each said mounting member including a distal end movable in a first direction past said front face of said support plate, latch elements mounted on said support plate, said latch elements being movable in a lateral direction for engagement with said mounting members to prevent movement of said distal ends in a second direction, opposite to said first direction, past said rear face, a plurality of support posts carried by said support plate and projecting outwardly therefrom, said support posts for holding said latch elements in position for engagement with said mounting members, each said latch element extending between and engaging at least two of said support posts.

5. The mechanism as recited in claim 4 wherein said latch elements comprise hairpin shaped elements having two substantially parallel legs, at least one of said legs being disposed to engage at least one of said mounting members to thereby prevent said distal ends from moving past said rear face.

* * * * *